United States Patent [19]

Hyatt et al.

[11] Patent Number: 5,678,962

[45] Date of Patent: Oct. 21, 1997

[54] INTEGRAL BORING AND THREADING TOOL AND METHOD

[75] Inventors: Gregory Aaron Hyatt; Stanley C. Weidmer, both of West Chester, Ohio

[73] Assignee: Makino Inc., Mason, Ohio

[21] Appl. No.: 523,556

[22] Filed: Sep. 5, 1995

Related U.S. Application Data

[63] Continuation-in-part of Ser. No. 301,329, Sep. 6, 1994, abandoned.

[51] Int. Cl.$^6$ .................... B23G 1/32; B23G 5/20
[52] U.S. Cl. .................... 409/66; 408/222; 409/74; 470/199
[58] Field of Search ............. 409/65, 66, 71, 409/74, 78; 408/222; 470/199; 407/31, 55

[56] References Cited

U.S. PATENT DOCUMENTS

| | | |
|---|---|---|
| Re. 35,255 | 5/1996 | Turchan . |
| 83,371 | 10/1868 | Foster . |
| 279,360 | 6/1883 | Douglas . |
| 931,526 | 8/1909 | Turner et al. . |
| 1,034,724 | 8/1912 | Mueller . |
| 1,316,718 | 9/1919 | Hall . |
| 1,361,098 | 12/1920 | Richards . |
| 1,365,954 | 1/1921 | Richards . |
| 1,408,793 | 3/1922 | Anderson, Jr. et al. . |
| 1,539,628 | 5/1925 | Bayer . |
| 1,836,954 | 12/1931 | Bryant . |
| 2,046,041 | 6/1936 | Spitz . |
| 2,191,177 | 2/1940 | McCollum . |
| 2,266,338 | 12/1941 | Sheaffer . |
| 2,286,477 | 6/1942 | Falls . |
| 2,312,354 | 3/1943 | Norberg . |
| 2,451,497 | 10/1948 | Kratchman . |
| 2,526,762 | 10/1950 | Miller . |
| 2,553,669 | 5/1951 | Norberg et al. . |
| 2,684,492 | 7/1954 | Miner et al. . |
| 2,703,419 | 3/1955 | Barth . |
| 2,703,490 | 3/1955 | Brueggeman et al. . |
| 2,735,116 | 2/1956 | Mueller . |
| 2,813,280 | 11/1957 | Huffman . |
| 2,898,612 | 4/1959 | Hofbauer . |
| 3,085,543 | 4/1963 | Mossberg . |
| 3,147,646 | 9/1964 | Rawcliffe, Jr. . |
| 3,180,379 | 4/1965 | Stewart . |
| 3,258,797 | 7/1966 | Budd . |
| 3,621,754 | 11/1971 | Ditson . |
| 4,050,842 | 9/1977 | Janin . |
| 4,116,578 | 9/1978 | Gelfand et al. . |
| 4,271,554 | 6/1981 | Grenell . |
| 4,375,708 | 3/1983 | Hellnick et al. . |
| 4,409,868 | 10/1983 | Huddle et al. . |
| 4,466,762 | 8/1984 | Menke . |
| 4,761,844 | 8/1988 | Turchan . |
| 4,831,674 | 5/1989 | Bergstrom et al. . |
| 4,913,604 | 4/1990 | Zaengerle . |
| 4,930,949 | 6/1990 | Giessler ............... 409/74 |
| 4,934,040 | 6/1990 | Turchan . |
| 4,943,191 | 7/1990 | Schmitt . |
| 5,143,492 | 9/1992 | Leeb . |

FOREIGN PATENT DOCUMENTS

| | | |
|---|---|---|
| 3922707 | 2/1990 | Germany . |
| 3934907 | 4/1991 | Germany . |
| 184721 | 8/1991 | Japan . |

Primary Examiner—Daniel W. Howell
Attorney, Agent, or Firm—Dinsmore & Shohl LLP

[57] ABSTRACT

A unitary bore forming and threading tool for producing a variety threaded bores having chamfers and counterbores without a need for tool changes. The improved took preferably includes a shaft of predetermined axial length and having proximal and distal ends, a shank located adjacent the proximal end, a holemaking element located adjacent the distal end, and a threadmill portion located axially between the bit and the shank. The holemaking element further includes a chamfering surface and an end cutting surface. The disclosed tool and method enable creation of a variety of bores such as chamfers, counterbores, and threaded bores by producing bore portions of selectively determined distinct diameters by sequentially axially feeding the tool into the workpiece along distinct tool paths without changing tools. If desired, one or more of the bore portions can be threaded with the threadmill by moving the threadmill in a selectively determined helical or nonhelical path.

41 Claims, 6 Drawing Sheets

INTEGRAL BORING AND THREADING TOOL AND METHOD

REFERENCE TO COPENDING APPLICATION

This is a continuation-in-part of prior application Ser. No. 08/301,329, filed Sep. 6, 1994 now abandoned.

TECHNICAL FIELD

This invention relates to cutting tools used for boring and threading, and more particularly, to an integral tool and method of using the tool to produce holes having various chamfers, counterbores, and threaded bores of different shapes, sizes and characteristics as desired and without having to change tools.

BACKGROUND

Threaded holes and bores are most frequently produced with multiple tools, typically including a center or spot drill for centering the subsequent tools and creating an initial chamfer, a drill for creating the core hole or bore, a counterbore tool, and a tap for threading the hole. Special drills are known which consolidate the first three tools to produce the chamfer, counterbore, and hole by incorporating multiple diameters into the grind of the tool. However, the shape of such a tool is complex, and it is generally expensive to manufacture and regrind. Since the diameters of the counterbore and chamfer are ground into the tool, they cannot be varied in use. Likewise, the length of the hole created in the workpiece, as well as the relative lengths of portions of the bore, is dependent on the length of the corresponding portions of the tool which are predetermined.

Other tools are known which have a threadmill ground into drill flutes so that, after drilling the hole and chamfer, the threads can be milled with the same tool. These tools, however, still cannot produce a hole with portions varying in length, diameter, or thread pitch from the physical tool section or sections from which it was produced. Moreover, since the chamfer portion of the tool is located on the rear of the assembly and requires a bore of full depth before the chamfer can be formed, the hole is limited to a predetermined depth and the chamfer is limited to a predetermined diameter.

Moreover, when drilling ductile materials, often a continuous chip is formed that is difficult to break. Such long chips can ball up, intertwine with other chips, and/or wrap around the tool, which in turn can create a "bird's nest" of which disposal is difficult. Thus, a need exists for an improved unitary boring and threading tool that can make holes of varying lengths, characteristics, and diameters that are distinct from the dimensional limitations of the tool, and that reduce chip disposal problems.

SUMMARY OF THE INVENTION

It is an object of the present invention to obviate the above-described problems and shortcomings of creating holes of varying length, diameter, shape, and threading with a single tool.

It is also an object of the present invention to provide a unitary tool which can selectively provide a variety of bores, counterbores, and chamfers without a need for tool changes.

It is another object of the present invention to provide a unitary rotating tool and method that can create and thread holes having counterbores and chamfers over a wide range of diameters, depths, and shapes by simply changing the tool path.

It is yet another object of the present invention to provide a simplified design for combination boring tools used to produce threaded holes so that the tools are easier and less expensive to manufacture and regrind, and which enable combination machining operations without repeated tool changes.

It is a further object of the present invention to obviate chip disposal problems previously known in the industry.

It is still another object of the present invention to provide a unitary tool that enables selective changing of the order and relative sizes of the bore's characteristics.

It is also an object of the present invention to provide a simplified design for combination boring tools used to produce internal or external threads of varying pitch.

It is still yet a further object of the present invention to provide a unitary rotating tool and method that can create and thread holes having chamfers of varying angle.

In accordance with one aspect of the present invention, an improved boring and threading tool is provided that has a shaft of predetermined axial length, and proximal and distal ends, where the distal end includes a holemaking element. The holemaking element preferably includes a chamfering surface adjacent the distal end, a counterbore surface axially behind the chamfering surface, and a threadmill located between the counterbore surface and the proximal end. The chamfering surface is preferably convex in shape such that chamfers of varying angle may be formed. The threadmill preferably includes one or more rows of teeth which are axially aligned. The counterbore surface will generally have an effective outside diameter which is substantially greater than or equal to the effective outside diameter of the threadmill. An alternative embodiment may have a counterbore surface which is slightly less (e.g., 0.001 inches) than the effective outside diameter of the threadmill.

The improved boring and threading tool may be used to fabricate a threaded or non-threaded bores in a workpiece, whereby there are at least two hole portions having distinct diameters and depths. For example, the resulting threaded bore may have a chamfer and a counterbore of distinct depths, central axes, and diameters, as desired, without a need for changing tools. The invention preferably can be implemented in a numerically controlled machine tool with three-axis control. A first bore portion having a selectively determined diameter and central axis is produced in the workpiece with the holemaking bit by axially feeding the bit into the workpiece and moving the bit upon a selectively determined first tool path having a first radius selected by the numerically controlled machine tool. If a noncircular bore is desired, the first tool path may be appropriately varied to produce such a bore.

A second bore portion can be created in the workpiece with a diameter and central axis which is distinct from the diameter of the first bore portion. Similarly, the second bore portion is produced with the holemaking bit by axially feeding the bit into the workpiece and moving the bit in a selectively determined second tool path having a selectively adjusted second radius with the numerically controlled machine tool.

This process can be repeated as many times as desired to produce a nearly infinite combination of bores with varying bore profiles, effective inside diameters, depths and alignments. Similarly, non-circular bores such as lobed counterbores or the like, can also be formed by an appropriate tool path modification, with or without axial feeding of the tool. Threads can be generated within a wall of any bore portion with the threadmill by moving the tool in a selectively determined helical path along an appropriate thread radius with the numerically controlled machine tool. Multiple lead-in threads can be generated utilizing a threadmill where every other tooth or plurality of teeth have been removed such that a respective number of lead-in threads will be formed. For example, if every other axial thread-cutting tooth is removed, a threaded bore having two lead-in threads can be formed. If every other two teeth are removed, a threaded bore having three lead-in threads can be formed.

In accordance with yet another aspect of the present invention, an improved boring and threading tool is provided wherein the threadmill has at least one thread-cutting tooth. If the threadmill has more than one tooth, all the teeth must be located at the same axial position on the threadmill so that threads of varying pitch can be formed. This embodiment also has a holemaking element and may include a chamfering surface and a counterbore surface. The counterbore surface will preferably have an effective outside diameter which is substantially less than the effective outside diameter of the threadmill. This embodiment is generally utilized in the same manner as described above except that a bore portion with threads is formed in one operation. For example, a threaded bore portion will generally be formed by axially feeding the threadmill into the workpiece. This operation mills both a bore and a series of rough threads in the bore portion because the effective outside diameter of the threadmill is greater than the effective outside diameter of the holemaking element, the chamfering surface, and the counterboring surface. The threads are then finished by retracting the tool from the threaded bore along the same path by which it entered. Threads of varying pitch can be formed by this tool by merely changing the feed rate of the tool.

External threads may also be formed on a workpiece with a tool of the present invention by feeding the tool along a helical rough thread cutting path with a given thread major diameter about a central axis of the workpiece. The threads are optionally finished by retracing the helical rough thread cutting path in reverse. Similarly, threads of varying pitch can be formed by this tool by merely changing the feed rate of the tool.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIGS. 3A-J show schematic side elevation views of exemplary blind threaded bores that may be produced by the tools and method of the present invention;

FIG. 4D is a top plan view showing an exemplary non-circular tool path of the tool forming a custom shaped bore.

DETAILED DESCRIPTION OF THE INVENTION

Figure 1A:
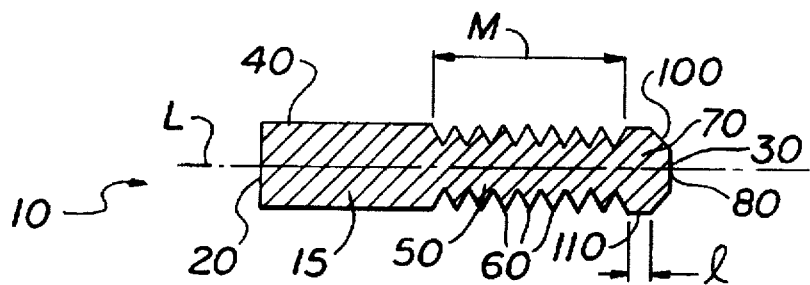
FIG. 1A is a cross-sectional side elevation view of an improved boring and threading tool made in accordance with the present invention.

Referring now to the drawings in detail, wherein like numerals indicate the same elements throughout the views, FIGS. 1A-H show a variety of schematic illustrations of exemplary preferred embodiments of an improved boring and threading tool 10 of the present invention. The tool 10 has a shaft 15 which is of a predetermined axial length with proximal (e.g., 20) and distal (e.g., 30) ends. Proximal end 20 has a shank 40 for insertion in the clamping jaws or chuck of a boring device or other machine tool. Adjacent and axially forward of the shank 40 and rearwardly of distal end 30, is a threadmill portion 50 which may preferably comprise one or more thread forming teeth 60 aligned in axial rows. As will be seen with respect to the embodiment of FIGS. 2F and 2G, however, the tool of the present invention may also be provided with only a single tooth 60 to enable formation of varying thread pitches with a single tool. In some tools made in accordance with this invention, a tool 10 may also be formed with no thread forming teeth on its threadmill portion 50. This is not preferred, however, as bores may be formed with or without threads regardless of whether threadmill teeth are provided on the tool, and for maximum adaptability, one or more teeth are preferred.

A holemaking element 70 preferably is arranged adjacent to and axially forward of the threadmill 50 at the distal end 30 of tool 10. The holemaking element 70 has an end cutting surface 80 which preferably is center cutting. All end cutting surfaces 80 preferably are provided with an adequate chip gullet (not shown) for chip disposal, especially when milling or drilling bores of small radii. Holemaking element 70 also preferably includes a chamfering surface 100 located adjacent to and axially behind end cutting surface 80, and a counterboring surface 110 located adjacent to and axially behind chamfering surface 100 for creating chamfers and counterbores as desired.

As will be understood, the substantially flat end cutting surface 80 of the tool of FIG. 1A, maximizes the useable thread depth of the hole. The alternative embodiment shown in FIG. 1B has a concave end cutting surface 80 for minimizing deflection of the tool 10, particularly when milling in a substantially helical tool path having a radius substantially corresponding with the outer diameter of the tool. FIGS. 1C-1F illustrates another alternative embodiment of tool 10 which has a convex end cutting surface 80 for providing improved chip control when cutting ductile materials. As will be understood, the convex surface can comprise curved surfaces (e.g. FIGS. 1D, F and H), distinct angled surfaces (e.g. FIGS. 1C, E and G), or any variety or combination of surface conformations.

Figure 1B:
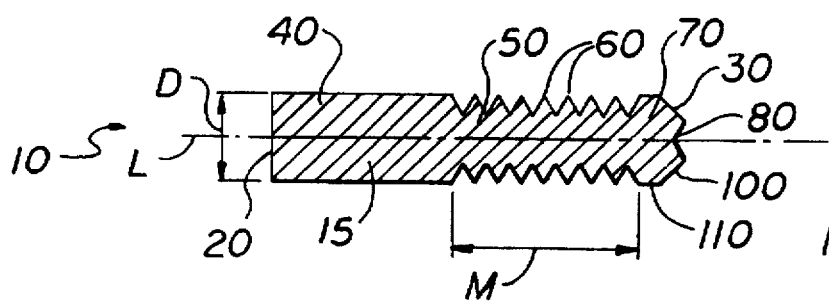
FIG. 1B illustrates an alternative embodiment of an improved boring and threading tool of the present invention and similar to that shown in FIG. 1 A, but showing a modified, concave holemaking element.
Figure 1C:
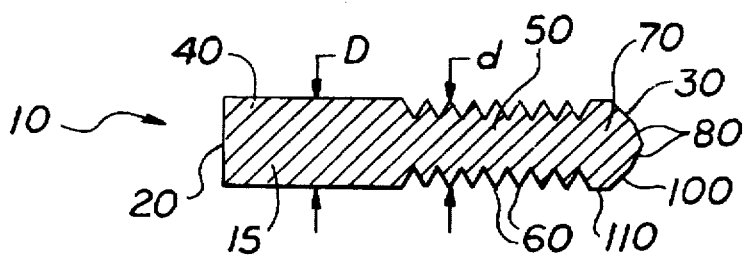
FIG. 1C shows yet another alternative embodiment of the improved boring and threading tool of the present invention illustrating a convex holemaking element.
Figure 1D:
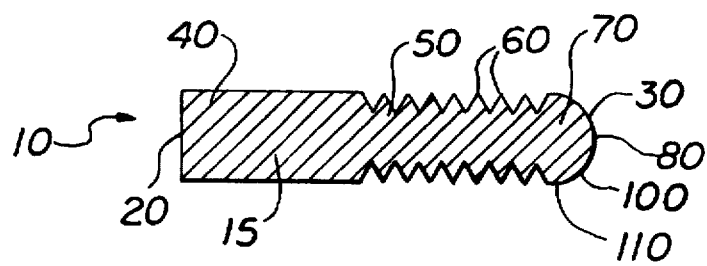
FIG. 1D depicts yet another alternative embodiment of the improved tool of the present invention, illustrating a combination of a convexly curved chamfering surface and a counterbore surface.
Figure 1E:
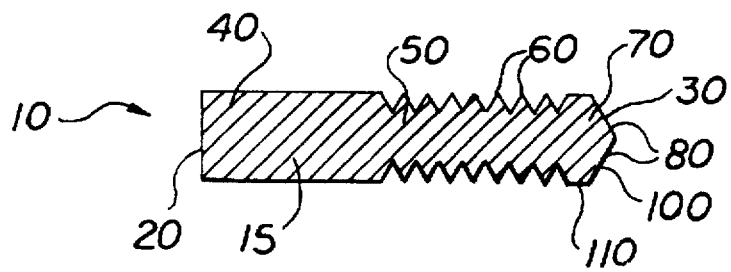
FIG. 1E discloses still another alternative embodiment of the improved tool of the present invention illustrating a modified, holemaking element.
Figure 1F:
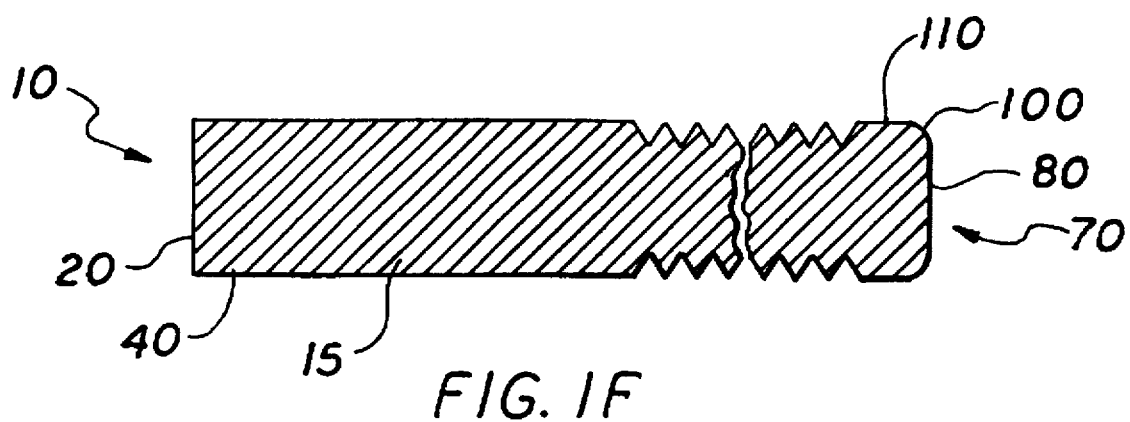
FIG. 1F illustrates another alternate embodiment of the improved tool of the present invention, wherein the chamfer surface is partially convexly curved in conformation.

FIGS. 1A-H also show a chamfering surface 100 on tool 10 preferably located adjacent to and axially rearward of the end cutting surface 80. FIGS. 1D and 1F illustrate alternative embodiments of tool 10 which have a convexly curved chamfering surface 100 for allowing interpolation of various angled chamfers. Particularly, such a configuration effectively provides a radiused chamfering surface which can provide a wide variety of chamfer conformations and sizes, limited essentially only by the path control capabilities of the machine. However, the axial infeed per helical revolution in the embodiment of FIG. 1D is limited by the profile tolerance of the chamfered surface as the surface generated will be somewhat scalloped. FIG. 1E depicts an alternative embodiment of tool 10 having an end cutting surface 80 which effectively incorporates an integral chamfering surface (e.g., 100) for providing the largest infeed rate possible; however, this end cutting surface 80 may not be adequate due to specifications for maximum hole depth, useable threads, or chip formation problems.

Thus, the advantage of tools 10, as shown in FIGS. 1D and 1F, is that the resulting shape of the chamfer is not preset. For example, single or multiple chamfers may be created having a single angle, multiple angle, or curved angle. Also, the chamfer may be formed in distinct conformations such as substantially circular, oval or trilobed. When tool 10 will be used only to generate a single chamfer angle, then regrinding that particular angle onto chamfering land 100 allows maximum axial infeed per revolution along the tool path during the chamfer forming process. Where a tool is contemplated for dedicated use for a particular application, formation of bit 70 with a predetermined chamfering land angle (e.g. as illustrated in FIGS. 1A-C, E and G) may be preferred.

Figure 1G:
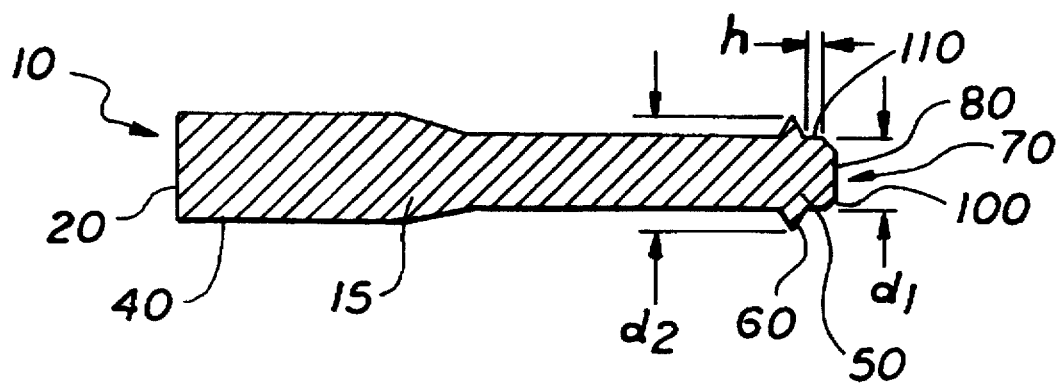
FIG. 1G shows still a further alternative embodiment of the improved tool of the present invention wherein the counterbore surface has an effective outside diameter which is less than the effective outside diameter of the threadmill and the threadmill has two thread-cutting teeth disposed at the same axial location on the threadmill.
Figure 1H:
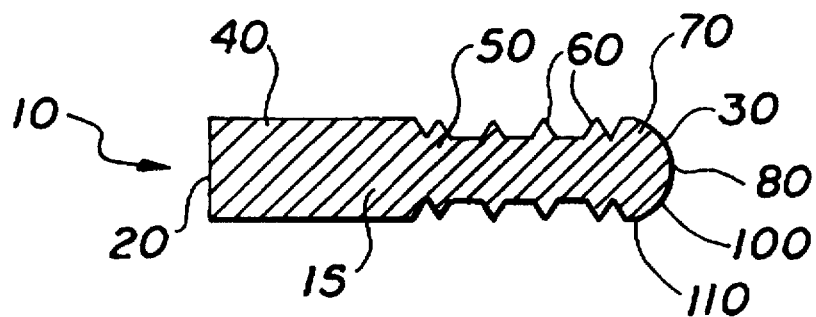
FIG. 1H illustrates still yet a further alternative embodiment of the improved tool of the present invention, wherein every other tooth in the axial rows of teeth of the threadmill have been removed for multiple lead threading.

FIGS. 1A-H show the improved cutting tool 10 of the present invention generally having counterboring surface 110 located adjacent to and axially behind chamfering surface 100. As will be appreciated, the axial length (e.g. l) of the counterboring surface 110 effectively limits the axial infeed per helical revolution when producing a counterbore or hole with the tool. Since increasing the axial length of the counterboring surface 100 would correspondingly increase the effective maximum speed of infeed, it also increases the axial length of the undercut or relief (e.g. length u shown in FIG. 2E) formed at the bottom of the finished threaded bore during threading procedures, as will be explained. Preferably, the axial length M (as illustrated in FIGS. 1A and B, for example) of the threadmill 50 must be equal to or greater than the maximum useable thread depth desired for any particular bore to be formed. The threadmill 50 preferably includes one or more teeth 60 axially aligned in rows. As best seen in FIG. 1H, an alternative embodiment is contemplated wherein every other tooth 60 along each axial row is removed such that multiple lead-in or start threads can be formed. Preferably, the diameter D of shank 40 (e.g. as illustrated in FIG. 1C) will be equal to or less than the diameter of the threadmill 50 in order to minimize the overall material cost of the tool and to maximize adaptability of the tool in use. However, in cases where the counterbore depth is considerable, and the ratio of length to diameter of the tool 10 is undesirable (for purposes of strength and rigidity), the shank 40 diameter D may be enlarged as appropriate. Preferably, tool 10 has a counterbore outside diameter $d_1$ which is substantially greater than or approximately equal to the threadmill outside diameter $d_2$, as seen best in FIGS. 1A through 1F.

Tool 10 as illustrated in FIG. 1G, comprises a threadmill 50 and a counterboring surface 100 having an effective outside diameter $d_1$ which is less than the effective outside diameter $d_2$ of the threadmill portion. Preferably, this embodiment also includes at least one thread cutting tooth 60, and is illustrated as having two thread forming teeth located at the same axial position on the tool. If the threadmill has more than one tooth, all the teeth must be located at the same axial position on the threadmill so that threads of varying pitch can be formed. An alternative embodiment, which is not illustrated in the drawings, may have a threadmill having at least two thread cutting teeth wherein one tooth is adjacent the counterboring surface and the second tooth is axially behind the first tooth. If the profile of the first tooth is slightly undersize (e.g., 0.05 inches) then the pitch may be varied by one half the amount of the undersize (e.g., a 0.05 inch undersize would permit a 0.025 variation in thread pitch). The threadmill is then axially infed in a helical pattern into the workpiece to form the threads along the desired portion of the bore wall. Use of this embodiment for threading a bore is more time consuming; however, the included thread angle (e.g., 60 degrees) remains the same so that one tool may generate distinct pitches. Thus, different pitches using the same tool can be formed with this alternative embodiment simply by varying the axial infeed rate.

Although tool 10 of the present invention may be used to create all types of bores (i.e. through bores, blind holes, etc.), FIGS. 2A-F illustrate the steps used to create an exemplary blind bore or hole having a chamfer, counterbore, and threaded bore in a workpiece with a tool 10 such as illustrated and described above with respect to FIG. 1A. Although a suitable means for controlling the operation of the tool 10 may be selected by one skilled in the art, preferably, a three-axis numerically controlled machine (not shown) is used. A numerically controlled machine can be preprogrammed to have several predetermined tool paths and manipulation programs stored in the controller, or manual controls could be used to input quality control data before or during a machining operation. Any suitable control arrangement may be used as determined by one skilled in the art, including manual operation of a hand held boring device. In addition, tool 10 may be used with quick change machine tools selected by those skilled in the art. Use with such quick change machine tools would enable multi-task boring operations as part of a larger machining operation. Substantial cost savings would result due to the multi-task functions of tool 10, because fewer tool changes would be required during operation.

Figure 2A:
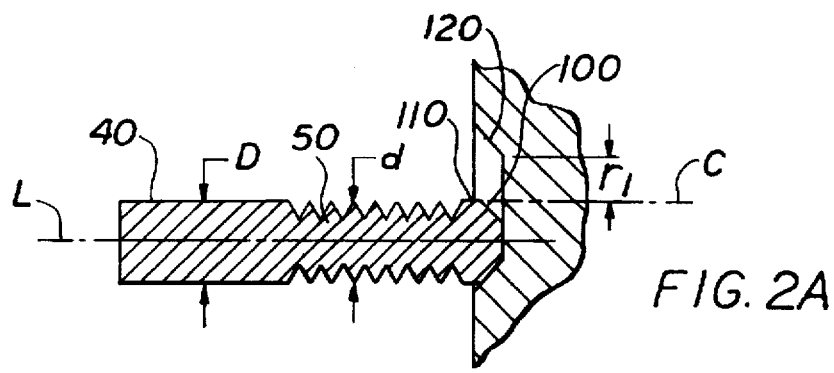
FIGS. 2A-E illustrate a series of schematic views illustrating various process steps of the improved tool of FIG. 1A forming a threaded bore.
Figure 2B:
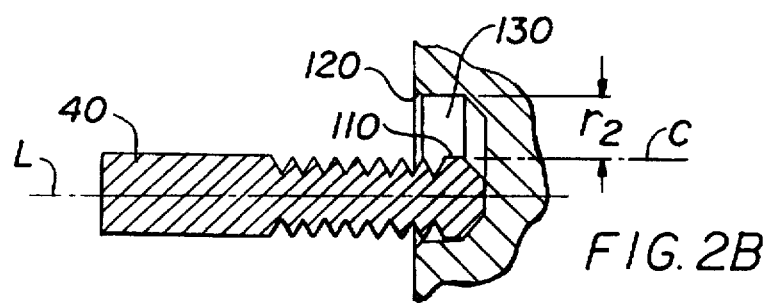

As shown in FIG. 2A, for example, a first bore portion or chamfer 120 is created by chamfering land 100 by rotating tool 10 about its longitudinal axis L and axially infeeding the tool into the workpiece along a path having a radius $r_1$, around chamfer center line C. The depth and diameter of the chamfer 120 optimally can be selectively controlled by the control means. As shown in FIG. 2B, a counterbore 130 can be produced by axially infeeding counterboring land 110 on a path having a radius $r_2$ that is distinct from the radius $r_1$ used to create the chamfer 120. The depth of the counterbore 130 is again selectively determined and controlled preferably by the numerically controlled machine.

As those skilled in the art will readily appreciate, noncircular bores and chamfers may also be formed utilizing tool 10 by moving the tool in a noncircular tool path perpendicular to the tool's axis. Noncircular bores of varying depth may be formed by selectively indexing the tool axially into the workpiece. For example, this process could be used to form oblong bores, obround bores, tri-lobed bores, or keyed bores. An exemplary noncircular tool path which might be utilized to create a tri-lobed bore or counterbore is illustrated in FIG. 4D. In addition, at least one non-coaxial bore may also be generated by tool 10 as shown in FIG. 3J.

Figure 2C:
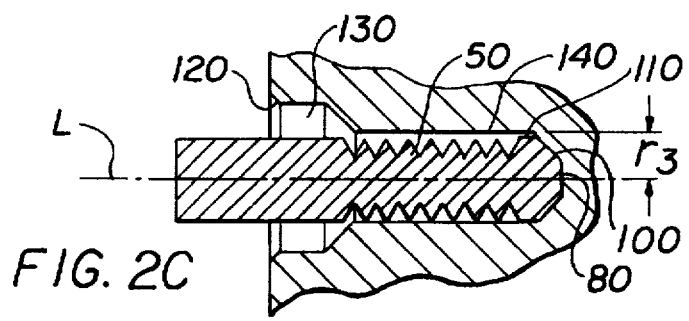
Figure 2D:
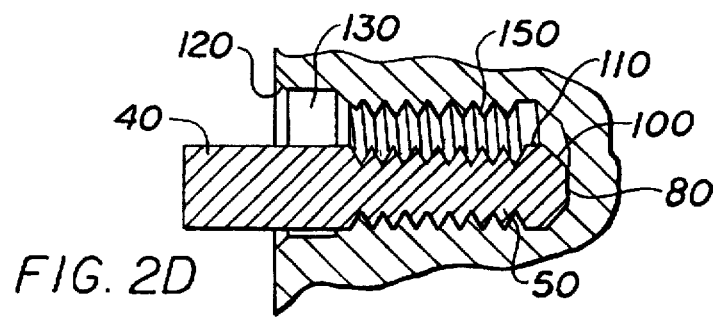
Figure 2E:
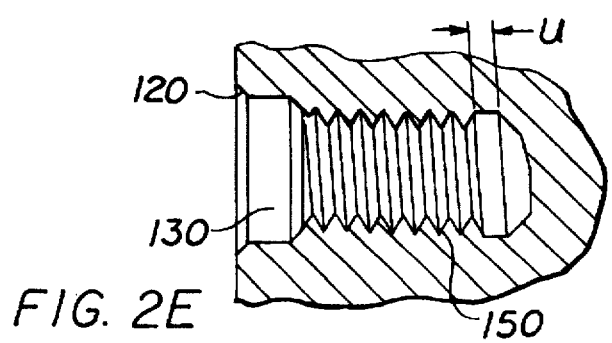

As shown in FIG. 2C, a bore 140 also can be produced with the same tool 10 by axially infeeding tool 10 to a desired depth on a tool path having a radius $r_3$ that is distinct from the respective radii (e.g., $r_1$ and $r_2$) of the tool paths used to create the chamfer 120 and counterbore 130. Obviously, if radius $r_3$ was the same as radius $r_2$, the counterbore 130 and the bore 140 would have the same diameter. As illustrated in FIG. 2D, at least a portion of bore 140 may also be threaded (threaded bore 150) with the same tool 10 by retracting tool 10 from the bore 140 a distance approximately equal to one and a half times the desired thread pitch. The desired helical path and radius ($r_4$) of the tool path are selected to produce the desired threads (e.g., longitudinal length, pitch, depth, etc.), and the threadmill 50 is then infed into bore 140 on a helical path for at least one, and preferably approximately one and one-half revolutions of the tool 10 about its axis l. FIG. 2E shows a completed threaded bore that can be created by unitary tool 10 in the manner described. If more than one start (or start-in) thread is desired, tool 10 may indexed about the central axis of the bore portion such that the start threads are equally spaced about the inside diameter of the bore portion. For example, if two start threads are desired, tool 10 would be indexed 180 degrees about the central axis of the bore portion and the helical thread producing step as described above would be repeated once thus producing two start threads. Alternatively, the embodiment of tool 10 illustrated in FIG. 1G may be substituted so that at least two start threads (not shown) may be formed in a single thread milling operation as described herein without having to index tool 10 for each additional start thread desired. As will be understood by those in the industry, tool 10 can be used to form multiple start-in threads in this way regardless of whether it has a single thread forming tooth, or a plurality of such teeth. It should also be noted that the exact order of the process steps can be altered somewhat. For example, the order of forming the bore 140, counterbore 130, and chamfer 120 can be rearranged as desired.

Figure 2F:
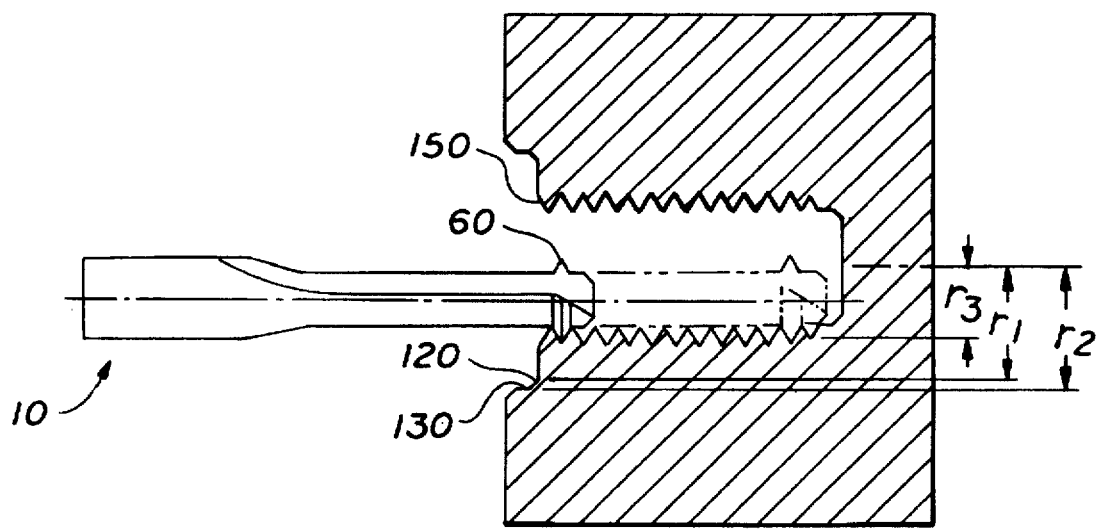
FIG. 2F similarly illustrates a schematic view of internal threads being formed using the improved tool of FIG. 1F.
Figure 2G:
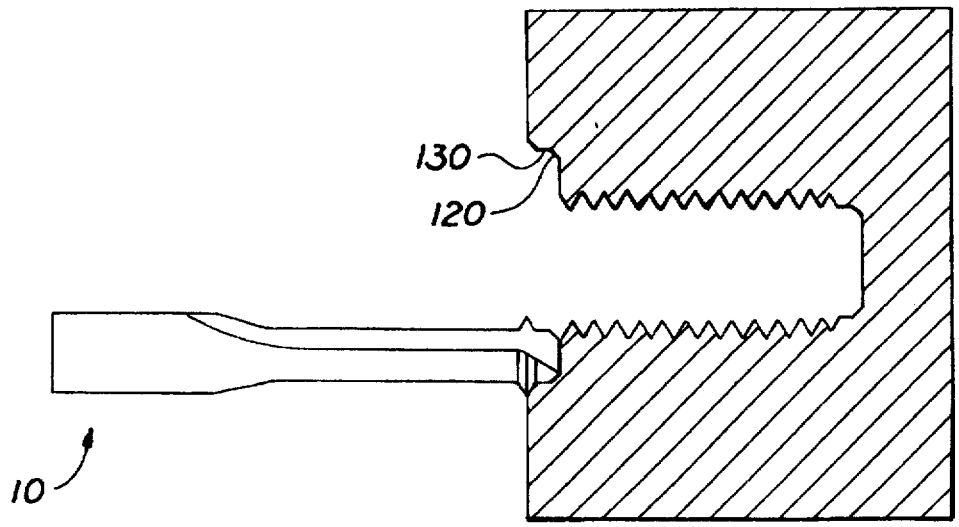
FIG. 2G depicts a schematic view illustrating the simultaneous forming of a chamfer and counterbore using the improved tool of FIG. 1F.

As best illustrated in FIGS. 2F-G, a preferred embodiment of tool 10, as illustrated in FIG. 1G, may also be used to form threads within a bore. Bore 140 and finished threads 150 are formed by helically infeeding tool 10 to a desired depth on a tool path having a radius $r_3$ that is distinct from the respective radii (e.g., $r_1$ and $r_2$) of the tool paths used to create chamfer 120 and counterbore 130. Obviously, because the largest effective outside diameter (e.g., $d_1$) of counterbore surface 110 is less than the largest effective outside diameter (e.g., $d_2$) of threadmill 50, the depth of counterbore 130 is limited by the height h of counterbore surface 110. The operation of helically infeeding tool 10 of FIG. 1G simultaneously mills both the bore and a rough thread of finished threads 150, as the tooth 60 is larger in diameter than holemaking element 70. Retracting tool 10 along the same path by which it was infed will allow tooth 60 to effective provide a "finish pass" to produce finished threads 150.

A chamfer 120 and counterbore 130 may be formed independently or simultaneously before or after the milling of bore 140. FIG. 2G depicts the simultaneous formation of chamfer 120 and counterbore 130 utilizing tool 10. Chamfer 120 and counterbore 130 may also be circular or non-circular in shape, limited only by the tool path undertaken to from these bores. This embodiment of tool 10 and combination thread mill and bore milling method also may be used to form threads externally on a workpiece such as a stud or boss (not shown in FIGS.) by helically moving tool 10 about the central axis of the workpiece so as to produce a thread of the desired pitch and thread major diameter. Alternatively, the embodiments of tool 10, as illustrated in FIGS. 1A though 1H, also may be used to form external threads on a workpiece if the helical infeed rate of tool 10 is synchronized with the thread pitch such that tool 10 is axially infed approximately 1.5 times the length of the desired thread pitch.

The examples of FIGS. 3A-3J are intended only as examples of the virtually unlimited variations of orders and combinations of bore features which can be implemented hereunder. It also should be noted that another key advantage to the present inventive tool lies in its inclusion of a holemaking element 70 in front of its threadmill structure 50, and in its location of the chamfering surface 100 adjacent the element. Because of this structure, tool 10 can be used to make multi-feature bores without tool changes, and chamfers of differing sizes and shapes can be provided without having to bore to the full depth of the tool to access a conventional proximally mounted chamfering structure. In a preferred embodiment, the forward-located combination end cutting surface 80, chamfering surface 100, and counterboring surface 100 (e.g., see FIGS. 1A-1H) provides substantially unbounded adaptability and applicability to the tool and method of the present invention.

FIGS. 3A-J show an exemplary variety of blind holes that may be created with a unitary tool 10 simply by using the method of this invention. Each bore does not have to have all three features, i.e., a chamfer, counterbore, and threaded bore, and the order of the location of such features can be varied without requiring tool changes. Likewise, each feature may occur several times in the same bore. Many combinations can thereby be produced depending on the application for which the bore is needed. As can be appreciated, the undercut end of the bore does not appear symmetrical. This is due to the threading process of the preferred embodiment where the threadmill is rotated on a helical path for about 1.5 revolutions.

Figure 3A:
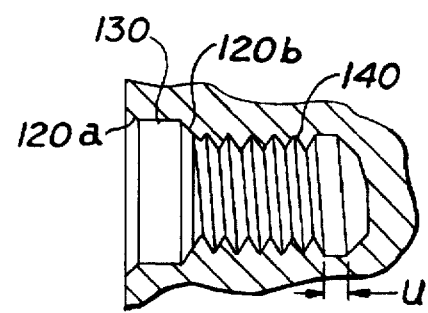
Figure 3B:
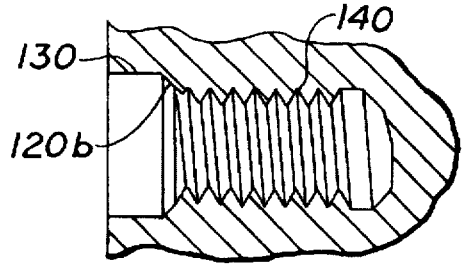
Figure 3C:
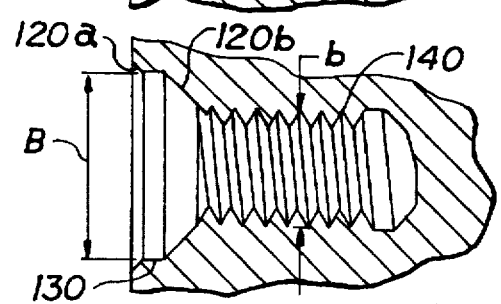
Figure 3D:
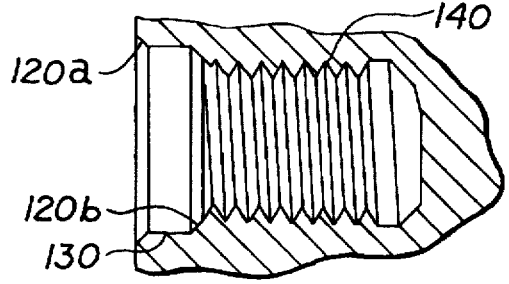
Figure 3E:
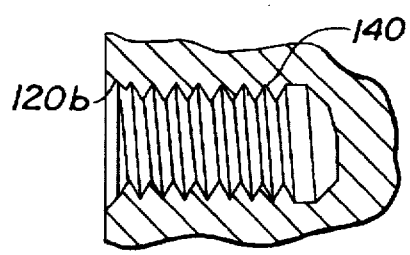
Figure 3F:
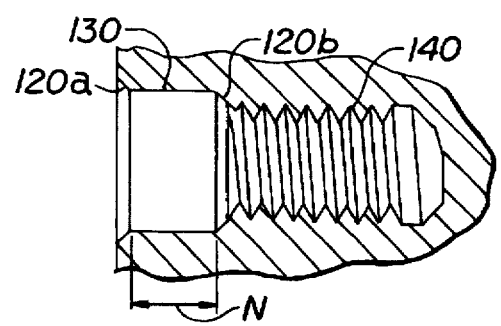
Figure 3G:
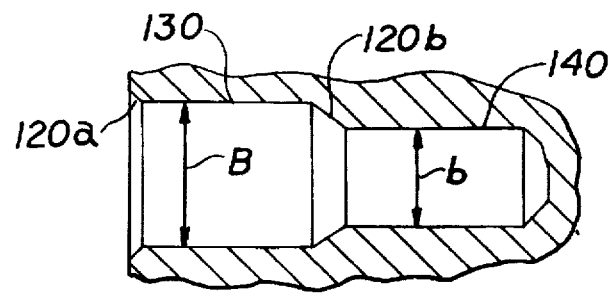
Figure 3H:
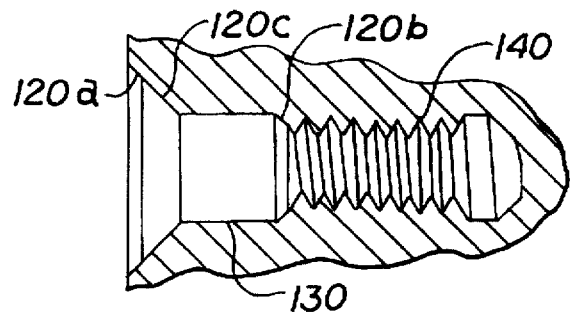
Figure 3J:
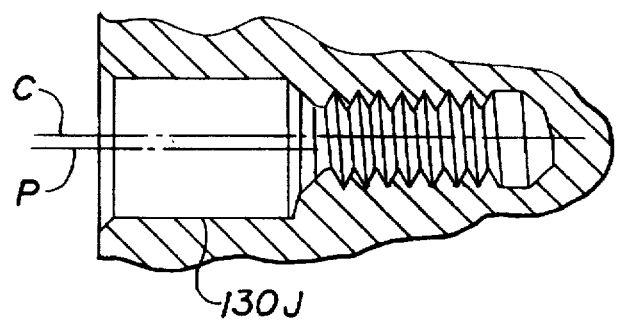

FIG. 3A discloses a threaded bore 140 having a chamfer 120a, a counterbore 130, a starting chamfer 120b, and a bore 140 with threading. This particular combination is substantially as described above with respect to FIGS. 2A-2E. FIG. 3B depicts a counterbore 130, followed by a starting chamfer 120B, and a threaded bore 140. FIG. 3C illustrates a threaded bore 140 having a chamfer 120a, a counterbore 130, and a starting chamfer 120b, wherein the effective outer diameter b of the threaded bore 140 is significantly less than the outer diameter B of the other portions (e.g., counterbore 130) of the bore. FIG. 3D shows a large diameter threaded bore 140 having a chamfer 120a, counterbore 130, and starting chamfer 120b. FIG. 3F discloses a threaded bore 140 having a chamfer 120a, counterbore 130, and starting chamfer 120b, wherein the axial length N of the counterbore is relatively longer than those shown in the previous examples. FIG. 3G shows a nonthreaded bore 140 having chamfer 120a, counterbore 130, and starting chamfer 120b, wherein the diameter B of the counterbore is greater than the diameter b of the bore. Note, that because no threads were desired in this bore, there is no undercut portion as there was in the example of FIG. 2E described above. FIG. 3H shows a threaded bore 140 having first chamfer 120a, second chamfer 120c, counterbore 130, and starting or third chamfer 120b.

FIG. 3J shows a counterbore 130 having a selectively determined bore center line or central axis C that is distinct and offset slightly from the alternate center line or central axis P of the threaded portion 140 of the bore. This example, illustrates another advantage of the subject unitary combination tool 10, wherein the radial tool path for forming the bore portions, especially for the counterbore 130, may be off-set to create custom, non-circular shaped bores as desired (i.e., oval or trilobed) which may not be coaxial with one another. For example, in such applications, such as aircraft parts, it is critical to provide for custom shapes of bores and holes for stress control or part alignment. The substantially free form on-the-fly control which can be implemented with the present unitary tool 10 allows for eccentricities and off-sets to be formed in virtually any of the bore features described herein. FIG. 3J illustrates such an off-set or eccentric counterbore 130$_r$.

Figure 4A:
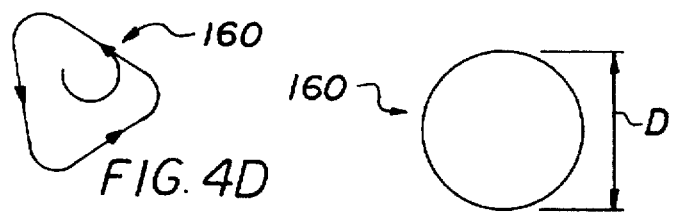
FIG. 4A is a top plan view of a typical tool path created in an x-y plane when the tool is forming a bore having a diameter equal to the diameter of the holemaking bit.
Figure 4A:
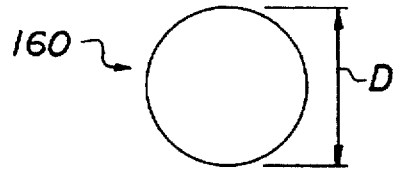
Figure 4B:
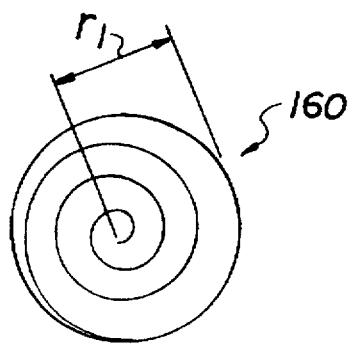
FIG. 4B is a top plan view illustrating a typical tool path in an x-y plane created when the tool is forming a bore having a diameter that is larger than the diameter of the holemaking bit.
Figure 4C:
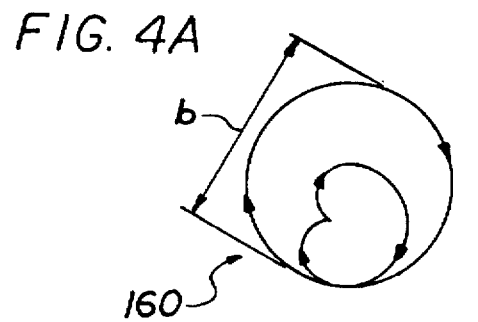
FIG. 4C is a top plan view showing a typical tool path of the tool forming threads in a bore.

It will be understood that the tool paths required to form particular bore features will differ depending on the bore portion being created. For example, FIG. 4A shows the plan view of a tool path 160 created by tool 10 when forming a hole that has a diameter that is greater than the diameter of the tool 10. Essentially, tool 10 is merely rotated about its central axis L and infed helically into the workpiece. FIG. 4B illustrates the top plan view of the conical tool path 160 created by tool 10 when it forms a hole having a radius (e.g., $r_1$) that is larger than the radius of the tool 10. For example, a tool having a convexly curved chamfering surface which is infed along the tool path illustrated in FIG. 4B will create a convex or concave radiused chamfer if the rate of axial infeed of tool 10 is continually varied during the axial infeed while maintaining a fixed rate of change for the involute. If the rate of axial infeed and the rate of change of the involute are both fixed, a conical surface with a constant chamfer angle will be generated. Alternatively, a change in either the axial infeed rate or the rate of change of involute during the axial infeed will generate a second distinct constant chamfer angle adjacent the first chamfer angle. Thus, a nearly infinite combination of chamfer angles and shapes may be formed adjacent one or more bore portions. FIG. 4C is likewise a top plan view of the helical tool path 160 of tool 10 when the tool 10 is forming threads in the hole. Because the tool 10 will be rotated about its longitudinal axis L, infed into the workpiece, and moved in a radial direction progressively outwardly to form threads, the increasing diameter spiral tool path results. FIG. 4D shows a tool path which is not circular, in that it has one or more flats, such as to provide a tri-lobed bore. Such a tool path may be implemented with or without axial infeeding.

The tool 20 may be constructed from many suitable materials depending on the type of application that the tool 10 will perform. Generally, the most preferred materials include carbide and high speed steel. In addition, the performance of a tool made according to this invention can be augmented with various external coatings such as titanium carbide, titanium nitride, titanium carbonitride, titanium aluminum nitride, diamond, or cubic boron nitride, depending upon the application. In addition, overheating of the tool 20 can be obviated by passing coolant through coolant openings in the tool (not shown) as is known in the industry. Similarly, chip removal can also be facilitated by appropriate fluing and/or application of cutting/cooling fluid to the bore during forming operations, as is common in the art.

Having shown and described the preferred embodiments of the present invention, further adaptations of the boring tool and method shown and described herein can be accomplished by appropriate modifications by one of ordinary skill in the art without departing from the scope of the present invention. Several of these potential modifications have been mentioned, and others will be apparent to those skilled in the art. Accordingly, the scope of the present invention should be considered in terms of the following claims and is understood not to be limited to the details of structure and operation shown and described in the specification and drawing.

We claim:

1. A method for forming a threaded bore in a workpiece, wherein the bore has at least two bore portions having distinct diameters, comprising the steps of:

providing a unitary rotating, combination bore forming and threading tool having a shaft with a predetermined axial length, a proximal end, and a distal end, said promixal end having a shank, said distal end having an end cutting surface, a chamfering surface adjacent said end cutting surface, and a threadmill adjacent and axially behind said chamfering surface;

providing means for controlling the bore forming movement of said rotating tool on three mutually perpendicular axes of a triordinate system;

producing a first bore portion having a selectively determined diameter and a first central axis by rotating said tool about its axial length and helically feeding said chamfering surface into the workpiece along said first central axis and moving said end cutting surface along a selectively determined path having a selectively adjusted first radius;

producing a second bore portion in the workpiece, said second bore portion having a selectively determined second central axis that is distinct from said central axis of said first bore portion, and a wall, said second bore portion being formed by helically feeding said end cutting surface into the workpiece and moving said surface upon a selectively determined second path having a selectively adjusted second radius about said second central axis; and generating threads in at least one of said first and second bore portions with said threadmill by moving said threadmill in a selectively determined helical path having a selectively adjusted third radius about said respective first or second central axis.

2. The method of claim 1, wherein said first and second bore portions are each provided with a selectively determined and distinct depth.

3. The method of claim 1, wherein said second central axis is coaxial with said first central axis.

4. The method of claim 1, wherein the step of providing said unitary rotating tool further comprises providing each of said chamfering surface and said threadmill with predetermined effective outer diameters, and said effective outer diameter of said chamfering surface being less than the effective outer diameter of said threadmill.

5. The method of claim 1, further comprising the steps of producing a third bore portion in said workpiece, said third bore portion having a selectively determined central axis that is distinct from said central axes of said first and second bore portions, said third bore portion having a diameter that is distinct from said diameters of said first and second portions and being formed with said end cutting surface by helically feeding said element into said workpiece and moving said element upon a selectively determined path having a selectively adjusted radius.

6. The method of claim 1, wherein said thread generating step further comprises the step of inserting said threadmill helically on a selectively determined radius.

7. The method of claim 1, wherein the step of providing a means for controlling the bore forming movement further comprises providing a numerically controlled machine tool.

8. The method of claim 1, further comprising the step of forming a chamfer adjacent at least one of said first and second bore portions.

9. The method of claim 8, wherein said step of forming said chamfer is undertaken either before or after formation of said respective first and second bore portions.

10. The method of 1, wherein said threads are generated simultaneously with at least one of said first and second bore portions.

11. The method of claim 1, further comprising the following steps:

forming rough thread in said wall of said second bore portion while moving said tool along a helical path into the workpiece; and finishing said threads by retracting said tool along said helical path.

12. A method for forming a threading combination bore along a selectively determined central axis in a workpiece, wherein the bore has at least two bore portions having distinct diameters, comprising the steps of:

providing a unitary rotating, combination bore forming and threading tool having shaft with a predetermined axial length, a proximal end, and a distal end, said proximal end having a shank and said distal end having an end cutting surface, and a threadmill adjacent and axially behind said end cutting surface;

providing means for controlling the forming movements of said tool on three mutually perpendicular axes of a triordinate system;

producing a first bore portion having a selectively determined diameter and a first central axis by rotating said tool about its axial length and helically feeding said end cutting surface into said workpiece along said first central axis and moving said surface along a selectively determined path having a selectively adjusted first radius controlled by said control means;

producing a second bore portion in the workpiece, said second bore portion having a selectively determined second central axis that is distinct from said first central axis, said second bore having a diameter being distinct from said diameter of said first bore portion, said second bore portion being formed with said end cutting surface by helically feeding said element into the workpiece and moving said element along a selectively determined path having a selectively adjusted second radius about said second central axis; and generating threads in at least one of said first and second bore portions with said threadmill by moving said threadmill in a selectively determined helical path having a selectively adjusted third radius about a respective first or second central axis.

13. The method of claim 12, further comprising the step of providing a chamfering land adjacent said hole forming element, and wherein said chamfering land and threadmill each have predetermined effective outside diameters, with said chamfering land having an outer effective diameter that is substantially equal to or less than the effective outer diameter of said treadmill.

14. The method of claim 11, wherein said threads are generated simultaneously with at least one of said first and second bore portions.

15. An improved integral rotating tool for selectively forming and threading bores, said tool comprising:

(A) a shaft of predetermined axial length and having proximal and distal ends, (B) a shank located adjacent said proximal end, (C) an end cutting surface located adjacent said distal end, (D) a chamfering surface adjacent said end cutting surface, (E) a counterboring surface located axially behind said chamfering surface, (F) a threadmill portion disposed between said counterboring surface and said shank, and wherein said threadmill portion and said counterboring surface have a predetermined effective outer diameters, said effective outer diameter of said threadmill portion being greater than said effective outer diameter of said counterboring portion.

16. The tool of claim 15, wherein said chamfering surface has a predetermined effective outer diameter, said effective outer diameter of said threadmill portion being greater than said effective outer diameter of said chamfering surface.

17. The tool of claim 15, wherein said end cutting surface has a predetermined effective outer diameter, said effective outer diameter of said threadmill portion being greater than said effective outer diameter of said end cutting surface.

18. The tool of claim 15, wherein said effective outer diameter of said threadmill portion is greater than said effective outer diameter of said end cutting surface and said effective outer diameter of said chamfering surface.

19. The tool of claim 15, wherein said threadmill portion comprises at least one thread-cutting tooth.

20. The tool of claim 15, wherein said threadmill portion comprises a plurality of axially spaced thread cutting teeth.

21. The tool of claim 15, wherein said threadmill comprises a plurality of thread-cutting teeth spaced axially apart for forming multiple start-in threads.

22. An improved integral rotating tool for selectively forming and threading bores, said tool comprising:

(A) a shaft of predetermined axial length and having proximal and distal ends, (B) a shank located adjacent said proximal end, (C) a chamfering surface in close proximity to said distal end, (D) a counterboring surface located axially behind said chamfering surface, (E) a threadmill portion disposed between said counterboring surface and said shank, and wherein said chamfering surface includes a convex surface for selectively forming chamfers of varying angle.

23. The tool of claim 22, where said convex chamfering surface comprises a curved surface.

24. The tool of claim 22, wherein said chamfering surface and said counterboring surface are connected to form a substantially uninterrupted surface on said tool.

25. The tool of claim 22, wherein said tool comprises an end cutting surface adjacent said distal end, said end cutting surface being substantially defined by said counterboring surface and said chamfering surface.

26. An improved integral rotating tool for selectively forming and threading bores, said tool comprising:
(A) a shaft of predetermined axial length and having proximal and distal ends,
(B) a shank located adjacent said proximal end,
(C) an end cutting surface located adjacent said distal end,
(D) a chamfering surface adjacent said hole forming element,
(E) a counterboring surface located axially behind said chamfering surface,
(F) a threadmill portion disposed between said counterboring surface and said shank, and wherein said end cutting surface has an angle less than 180 degrees.

27. An improved method for forming a threaded bore in a workpiece, said method comprising the steps of:
(A) providing a tool having a shaft of predetermined axial length and having proximal and distal ends, a shank located adjacent said proximal end, a hole forming element located adjacent said distal end, and a threadmill portion disposed between said hole making element and said shank;
(B) controlling the bore forming movements of said tool on three mutually perpendicular axes of a triordinate system; and
(C) producing a threaded bore portion with said threadmill portion and said hole making element, said threaded bore portion having a selectively determined central axis, a selectively determined bore depth, and a selectively determined bore radius, said threaded bore being formed by rotating said tool about its axial length and helically feeding said tool into the workpiece and moving said tool upon a selectively determined bore tool path for said bore depth and radius.

28. The method of claim 27, further comprising the following steps:
(A) providing a unitary tool wherein said hole forming element comprises a counterboring surface, and each of said counterboring surface and said threadmill portion have a predetermined effective outer diameters, said effective outer diameter of said threadmill portion being greater than said effective outer diameter of said counterboring surface and said threadmill portion has a plurality of teeth aligned in axial rows; and
(B) axially infeeding said threadmill portion on a helical tool path having a selectively determined thread radius about said central axis.

29. The method of claim 27, further comprising the step of producing a plurality of bore portions in said workpiece with said tool.

30. The method of claim 29, wherein said selectively determined central axis of at least two bore portions are not coaxial.

31. The method of claim 29, wherein said second bore portion formed comprises a chamfer adjacent at least one other bore portion, said chamfer being formed by moving said tool on a chamfer tool path perpendicular to said axial length of said shaft.

32. The method of claim 31, wherein said chamfer tool path is noncircular.

33. The method of claim 29, wherein at least one of said bore portions comprises a counterbore formed by said counterbore surface by moving said tool on a selectively determined counterbore tool path perpendicular to said counterbore surface.

34. The method of claim 33, wherein said counterbore tool path is noncircular.

35. The method of claim 28, wherein said step of providing a unitary tool further comprises providing said threadmill portion with a plurality of thread-cutting teeth spaced axially apart for forming at least two start-in threads.

36. The method of claim 28, wherein said thread generating step further comprises the following steps for forming multiple start-in thread in said bore portion:
(A) axially retracting said threadmill portion out of said bore portion by a length at least equal to the length of the desired thread pitch;
(B) indexing said tool about the central axis of said bore portion such that said multiple start-in threads are approximately equally spaced thereabout;
(C) axially infeeding said threadmill portion on a helical path having a selectively determined thread radius about said central axis;
(D) moving said tool along said path for at least one revolution along said selectively determined thread radius; and
(E) repeating these steps as necessary to create said multiple start-in threads.

37. The method of claim 27, further comprising the following steps:
(A) providing a unitary tool wherein said hole forming element comprises a counterboring surface, and each of said counterboring surface and said threadmill portion having a predetermined effective outer diameter, said counterboring surface outer diameter being less than said effective outer diameter of said threadmill, and wherein said threadmill has at least one thread-cutting tooth for forming threads of varying pitch; and
(B) generating threads simultaneously with said bore producing step by selectively helically feeding said tool into said workpiece along a selectively determined thread radius and pitch about said central axis.

38. The method of claim 36, further comprising the step of finishing said threads in said bore portion by helically retracting said threadmill from said threaded bore portion.

39. A method of forming a threaded bore in a workpiece, comprising the steps of:
(A) providing a unitary rotating combination bore forming and threading tool having a shaft with a predetermined axial length, a proximal end, a distal end, and a shank adjacent said proximal end, said distal end having a hole making element, a chamfering surface adjacent said hole making element, a counterboring surface located axially behind said chamfering surface, and a threadmill disposed between said counterboring surface and said shank;
(B) controlling the bore forming movements of said rotating tool on three mutually perpendicular axes of a triordinate system; and
(C) producing at least two bore portions in the workpiece with said tool wherein each of said bore portion has a selectively determined central axis, a selectively determined bore depth, and a selectively determined bore radius, and wherein said selectively determined central axes of at least two bore portions are not coaxial, and each bore portion being formed by rotating said tool about its axial length and axially feeding said tool into the workpiece and moving said tool upon a selectively determined bore tool path for said bore depth.

40. A method of forming a threaded bore in a workpiece, comprising the steps of:
  (A) providing a unitary rotating combination bore forming and threading tool having a shaft with a predetermined axial length, a proximal end, a distal end, and a shank adjacent said proximal end, said distal end having a hole making element, a chamfering surface adjacent said hole making element, a counterboring surface located axially behind said chamfering surface, and a threadmill disposed between said counterboring surface and said shark;
  (B) controlling the bore forming movements of said rotating tool on three mutually perpendicular axes of a triordinate system; and
  (C) producing at least two bore portions in the workpiece with said tool wherein each of said bore portion has a selectively determined central axis, a selectively determined bore depth, and a selectively determined bore radius, and each bore portion being formed by rotating said tool about its axial length and axially feeding said tool into the workpiece and moving said tool upon a selectively determined bore tool path for said bore depth, wherein one of said bore portions formed comprises a chamfer adjacent at least one other bore portion, said chamfer being formed by moving said tool on a noncircular chamfer path perpendicular to said tool's axial length.

41. A method of forming a threaded bore in a workpiece, comprising the steps of:
  (A) providing a unitary rotating combination bore forming and threading tool having a shaft with a predetermined axial length, a proximal end, a distal end, and a shank adjacent said proximal end, said distal end having a hole making element, a chamfering surface adjacent said hole making element, a counterboring surface located axially behind said chamfering surface, and a threadmill disposed between said counterboring surface and said shark;
  (B) controlling the bore forming movements of said rotating tool on three mutually perpendicular axes of a triordinate system; and
  (C) producing at least two bore portions in the workpiece with said tool wherein each of said bore portion has a selectively determined central axis, a selectively determined bore depth, and a selectively determined bore radius, and each bore portion being formed by rotating said tool about its axial length and axially feeding said tool into the workpiece and moving said tool upon a selectively determined bore tool path for said bore depth, wherein one of said bore portions formed comprises a counterbore adjacent at least one other bore portion, said counterbore being formed by moving said tool on a noncircular counterbore path perpendicular to said counterbore surface.

* * * * *

UNITED STATES PATENT AND TRADEMARK OFFICE
CERTIFICATE OF CORRECTION

PATENT NO. : 5,678,962
DATED : October 21, 1997
INVENTOR(S) : Gregory A. Hyatt, et al.

It is certified that error appears in the above-identified patent and that said Letters Patent is hereby corrected as shown below:

In claim 39, line 11, replace "shark" with --shank--.
In claim 40, line 11, replace "shark" with --shank--.
In claim 41, line 11, replace "shark" with --shank--.

Signed and Sealed this

Sixth Day of January, 1998

Attest:

BRUCE LEHMAN

Attesting Officer      Commissioner of Patents and Trademarks